United States Patent
Taylor et al.

(10) Patent No.: US 10,397,658 B1
(45) Date of Patent: Aug. 27, 2019

(54) IDENTIFYING RELEVANT GAMEPLAY CONTENT FOR A GAME ENVIRONMENT USING A VECTOR-SPACE FRAMEWORK

(71) Applicant: Sony Interactive Entertainment Inc., Tokyo (JP)

(72) Inventors: Michael Taylor, San Mateo, CA (US); Glenn Black, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/892,213

(22) Filed: Feb. 8, 2018

(51) Int. Cl.
| | |
|---|---|
| *H04N 21/231* | (2011.01) |
| *H04N 21/478* | (2011.01) |
| *H04N 21/482* | (2011.01) |
| *A63F 13/86* | (2014.01) |
| *A63F 13/47* | (2014.01) |
| *H04N 21/81* | (2011.01) |
| *A63F 13/53* | (2014.01) |
| *G06K 9/00* | (2006.01) |

(52) U.S. Cl.
CPC .......... *H04N 21/482* (2013.01); *A63F 13/53* (2014.09); *A63F 13/86* (2014.09); *H04N 21/4781* (2013.01); *H04N 21/8133* (2013.01); *G06K 9/00711* (2013.01)

(58) Field of Classification Search
CPC ....... H04N 21/23109; H04N 21/23418; H04N 21/2393; H04N 21/26603; H04N 21/2743; H04N 21/278
USPC ...................................................... 725/86, 87
See application file for complete search history.

(56) References Cited

U.S. PATENT DOCUMENTS

| | | |
|---|---|---|
| 10,143,924 B2 * | 12/2018 | McKenzie ............ A63F 13/497 |
| 2017/0255829 A1 | 9/2017 | Chang et al. |
| 2017/0256065 A1 | 9/2017 | Wu et al. |

FOREIGN PATENT DOCUMENTS

| | | |
|---|---|---|
| WO | PCT/US18/68225 | 12/2018 |
| WO | PCT/US18/68231 | 12/2018 |

OTHER PUBLICATIONS

U.S. Appl. No. 15/892,208, Michael Taylor, A Vector-Space Framework for Evaluating Gameplay Content in a Game Environment, filed Feb. 6, 2018.
PCT Application No. PCT/US2018/068225 International Search Report and Written Opinion dated Apr. 15, 2019.
PCT Application No. PCT/US2018/068231 International Search Report and Written Opinion dated Apr. 15, 2019.

* cited by examiner

*Primary Examiner* — Dominic D Saltarelli
(74) *Attorney, Agent, or Firm* — Polsinelli LLP

(57) ABSTRACT

A media system employs techniques to identify relevant gameplay content in a game environment using a vector-space framework. These techniques include generating a user query based on feature-values for features associated with a user frame of a user stream, mapping the user query to a user vector in a vector-space, selecting relevant content streams from a plurality of content streams based on a proximity between the user vector and position vectors mapped to the plurality of content streams, and presenting at least a portion of the relevant content streams.

20 Claims, 15 Drawing Sheets

400

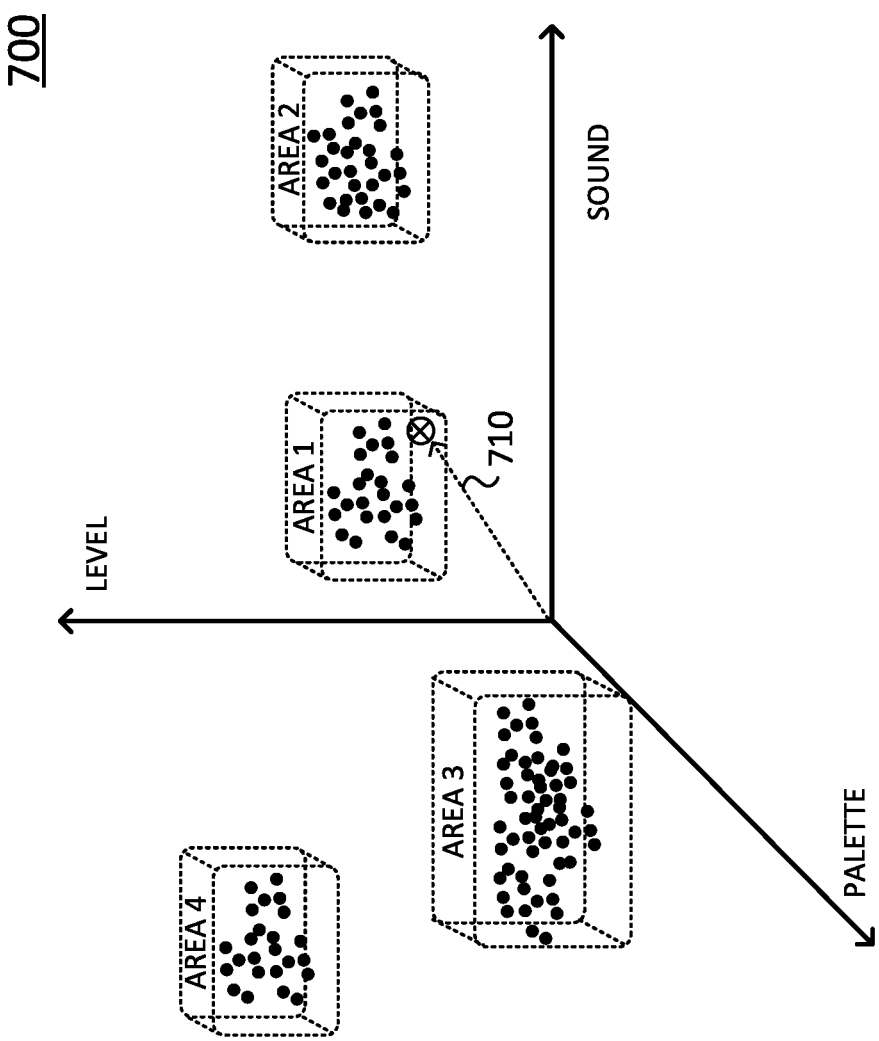

IDENTIFYING RELEVANT GAMEPLAY CONTENT FOR A GAME ENVIRONMENT USING A VECTOR-SPACE FRAMEWORK

BACKGROUND OF THE INVENTION

Field of the Invention

The present disclosure generally relates to gameplay in a game environment, and more particularly, to identifying relevant gameplay content using on vector-space representations of content streams.

Description of the Related Art

Technological advances that gave rise to our modern information age also facilitated an explosion of easily and readily accessible content. In turn, this explosion presents new challenges and creates new opportunities to efficiently evaluate, prioritize, filter, and deliver content to a particular consumer. Indeed, modern approaches to evaluate and index content often involves complex and time-consuming processes that attempt to contextually identify, compare, and match an ever increasing number of features associated with the content.

Similarly, searching for content relevant to a particular consumer becomes increasingly difficult in the context of the video/entertainment industry because professionals and consumers alike continuously generate large amounts of diverse content. For example, conventional searches to identify relevant gameplay content in a given game environment often require carefully crafted text queries that include important keywords for describing aspects of a particular scene, location, area, milestone, transition, etc. But text queries that attempt to describe gameplay content often prove inadequate and are inappropriate vehicles for capturing a myriad of diverse features (e.g., sounds, images, videos, feedback, etc.). Moreover, this myriad of diverse features continues to evolve and become more complex as the video/entertainment industry provides more and more immersive experiences (e.g., virtual reality (VR), etc.). Indeed, despite sophisticated search algorithms and powerful processing hardware, an old adage remains true—a picture is worth a thousand words. What's more, given the evolving nature of immersive experiences, each experience is quickly becoming worth a thousand pictures. Therefore, there is a need in the art for an improved vector-space framework for evaluating gameplay content in a game environment.

SUMMARY OF THE PRESENTLY CLAIMED INVENTION

This disclosure generally describes techniques to identify relevant gameplay content for a game environment using a vector-space framework. In one exemplary embodiment, these techniques are described by a method that includes steps for monitoring a user stream and/or a user frame for the user stream and generating a user query based on feature-values for features associated with the user stream/user frame. The method further includes steps for mapping the user query to a user vector in a vector-space (where one feature corresponds to one dimension), selecting relevant content streams from a plurality of content streams based on a proximity between the user vector and position vectors mapped to the plurality of content streams, and presenting at least a portion of the relevant content streams.

In some embodiments, the method further includes steps for determining relevant feature-values for features associated with the relevant content streams and/or associated with underlying frames for respective content streams and assigning priority values to the relevant content streams based on the relevant feature-values. For example, the features can include a gameplay transition time, a gameplay status, a number of votes, a number of points, an inventory, a character selection, a health of a character, a sound, a color palette, a transition time, a level, a position, a gameplay milestone, and the like. In addition, in such embodiments, the method further presents the relevant content streams based on respective priority values.

In other embodiments, the method also includes steps for evaluating the content streams according to threshold conditions. For example, the method may include steps for determining gameplay transition times for the content streams, comparing the gameplay transition times to a threshold transition time, and selecting the relevant content streams that satisfy the threshold transition time. Notably, this threshold condition is not limited to a threshold transition time, but instead includes any type of threshold condition (e.g., a gameplay status, a number of points, an inventory, a character selection, a health of a character, a sound, a color palette, a level, a position, a gameplay milestone, and so on). Similarly, in further embodiments, the method also includes steps for evaluating content streams according to gameplay metrics, which may include the foregoing threshold conditions as well as further include criteria related to popularity such as a number of votes, views, and the like.

In another embodiment, a system employs the above discussed techniques to identify relevant gameplay content for a game environment using a vector-space framework. For example, the system includes a network interface to communicate over one or more communication networks, a processor coupled to the network interface and adapted to execute one or more processes, and a memory configured to store a process executable by the processor. The system (e.g., the processor) executes the process and is operable to monitor a user stream and/or a user frame for the user stream and generate a user query based on feature-values for features associated with the user stream/user frame. The system is further operable to map the user query to a user vector in a vector-space (where one feature corresponds to one dimension), select relevant content streams from a plurality of content streams based on a proximity between the user vector and position vectors mapped to the plurality of content streams, and present at least a portion of the relevant content streams.

In yet another embodiment, a tangible, non-transitory, computer-readable media includes software with encoded instructions executable by a processor. The processor executes the instructions and is operable to monitor a user stream and/or a user frame for the user stream and generate a user query based on feature-values for features associated with the user stream/user frame. The system is further operable to map the user query to a user vector in a vector-space (where one feature corresponds to one dimension), select relevant content streams from a plurality of content streams based on a proximity between the user vector and position vectors mapped to the plurality of content streams, and present at least a portion of the relevant content streams.

BRIEF DESCRIPTION OF THE DRAWINGS

FIG. 7 illustrates a schematic diagram of a vector-space, showing position vectors assigned to on one or more areas in the game environment;

DETAILED DESCRIPTION

As used herein, the term "user" refers to a user of an electronic device(s) and actions performed by the user in the context of computer software shall be considered to be actions to provide an input to electronic device(s) that cause the electronic device to perform steps or operations embodied in computer software. As used herein, the terms "stream", "content", and/or "channel" generally refer to media content that includes visual and/or audio data. As used herein, the term "frame" refers to media frames that form part of a content stream;

As discussed above, an ever increasing amount of diverse content presents new challenges for evaluating and indexing content as well as searching for relevant content. In the context of the video/entertainment industry, such challenges are further magnified by the evolving immersive nature of experiences which provide the myriad of diverse features (e.g., sounds, images, videos, feedback, etc.). In context of a game environment, users often search for videos of gameplay content to help hone their skills, watch other players of interest, identify helpful walk-through videos, and the like. However, such users typically spend a lot of time parsing through a large quantity of content to find relevant content due to the inherent limitations of text-based searches for image-based content. Accordingly, this disclosure provides techniques to create a framework in a vector-space that includes vector positions mapped to frames/content streams and evaluate gameplay content in terms of the vector-space. With respect to evaluating gameplay content, this disclosure describers techniques to create content streams from various frames, determine user-locations in a game environment, identify content streams as relevant to a particular user, and so on.

Figure 1:
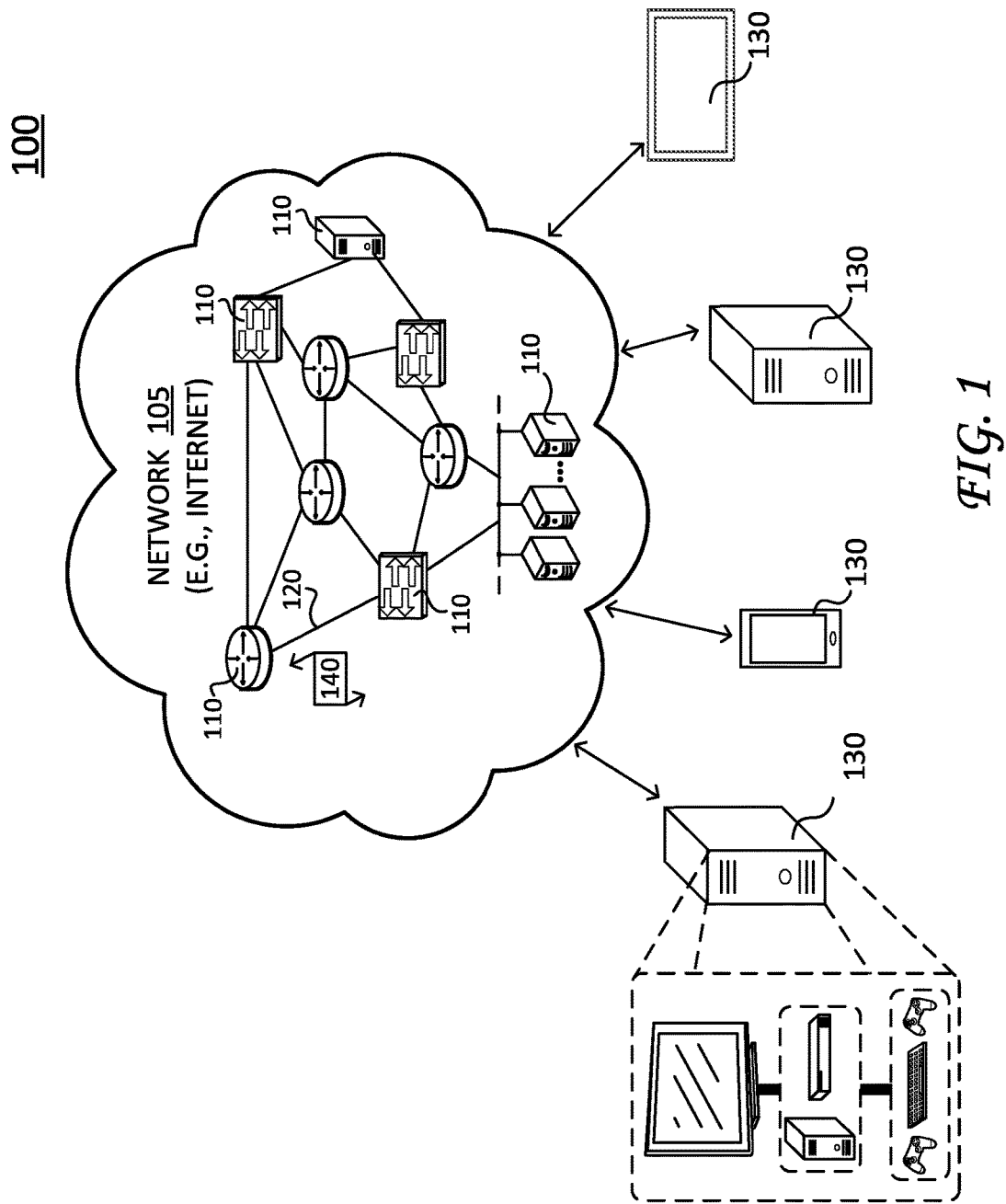
FIG. 1 illustrates a schematic diagram of an example communication network.

Referring to the figures, FIG. 1 illustrates a schematic diagram of an example communication environment 100. As shown, communication environment 100 includes a communication network 105 that represents a distributed collection of devices/nodes 110 interconnected by communication links 120 (and/or network segments) for exchanging data such as data packets 140 as well as transporting data to/from end nodes or client devices 130. Client devices 130 include personal computing devices, entertainment systems, game systems, laptops, tablets, mobile devices, and the like.

Communication links 120 represent wired links or shared media links (e.g., wireless links, PLC links, etc.) where certain devices/nodes (e.g., routers, servers, switches, client devices, etc.) communicate with other devices/nodes 110, based on distance, signal strength, operational status, location, etc. Those skilled in the art will understand that any number of nodes, devices, links, etc. may be included in communication network 105, and further the view illustrated by FIG. 1 is provided for purposes of discussion, not limitation.

Data packets 140 represent network traffic/messages which are exchanged over communication links 120 and between network devices 110/130 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the devices or nodes interact with each other.

Figure 2:
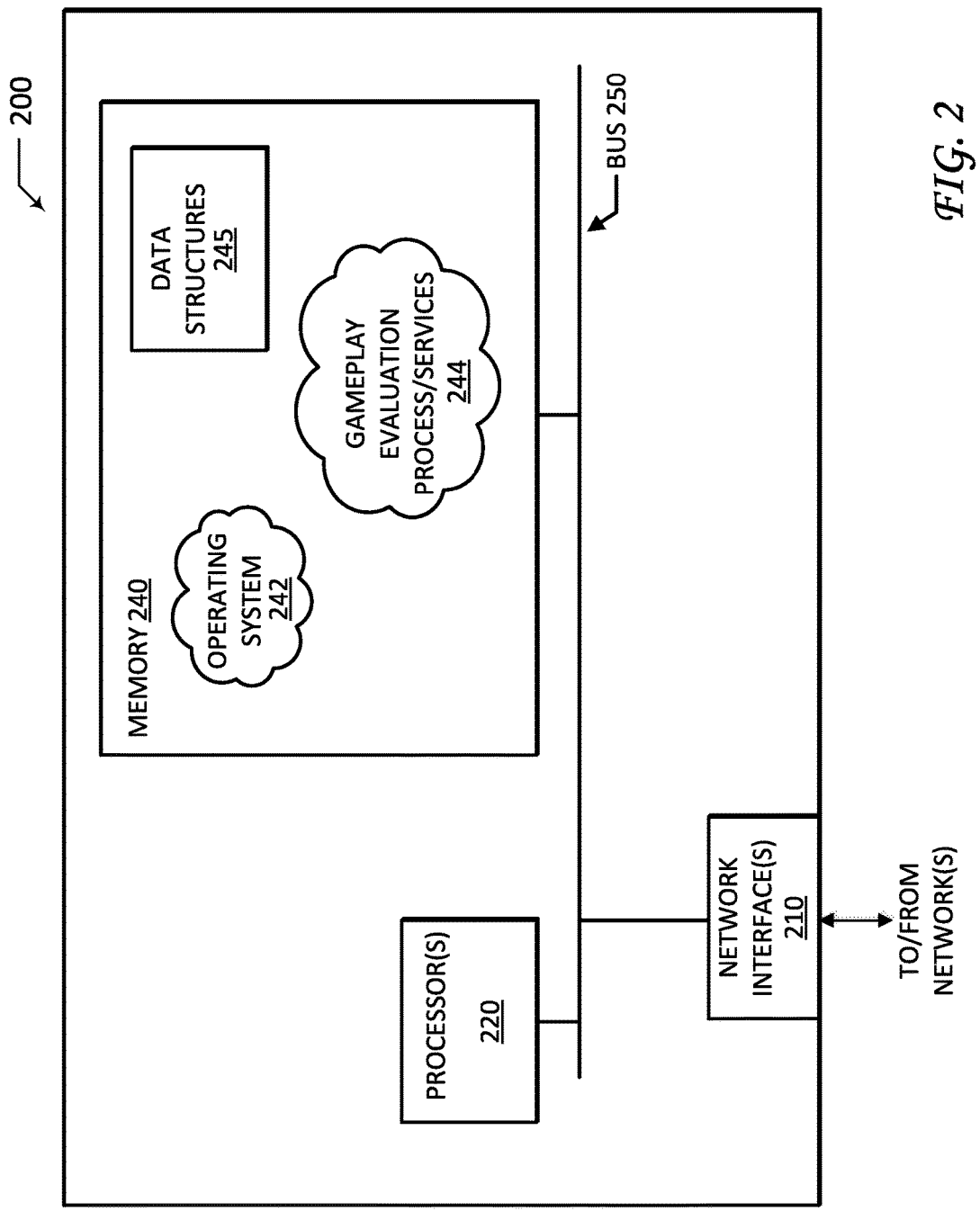
FIG. 2 illustrates a block diagram of an example network device.

FIG. 2 illustrates a block diagram of an example device 200, which may represent one or more of devices 110/130 (or portions thereof). As shown, device 200 includes one or more network interfaces 210 (e.g., transceivers, antennae, etc.), at least one processor 220, and a memory 240 interconnected by a system bus 250.

Network interface(s) 210 contain the mechanical, electrical, and signaling circuitry for communicating data over communication links 120 shown in FIG. 1. Network interfaces 210 are configured to transmit and/or receive data using a variety of different communication protocols, as will be understood by those skilled in the art.

Memory 240 comprises a plurality of storage locations that are addressable by processor 220 and store software programs and data structures associated with the embodiments described herein. For example, memory 240 can include a tangible (non-transitory) computer-readable medium, as is appreciated by those skilled in the art.

Processor 220 represents components, elements, or logic adapted to execute the software programs and manipulate data structures 245, which are stored in memory 240. An operating system 242, portions of which are typically resident in memory 240, and is executed by processor 220 to functionally organizes the device by, inter alia, invoking operations in support of software processes and/or services executing on the device. These software processes and/or services may comprise an illustrative gameplay evaluation process/service 244. Note that while gameplay evaluation process/service 244 is shown in centralized memory 240, it may be configured to collectively operate in a distributed communication network of devices/nodes.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having gameplay evaluation process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

Figure 3:
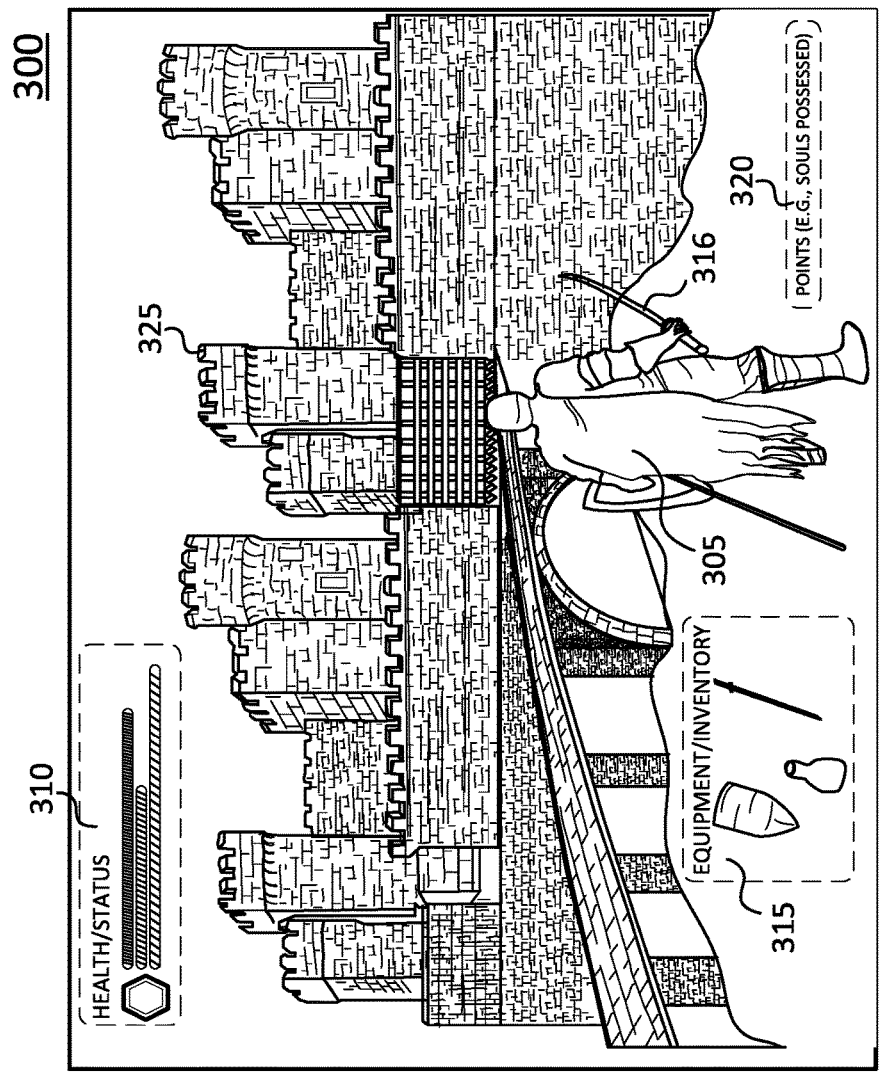
FIG. 3 illustrates a third-person perspective view of gameplay in a game environment, represented by a frame for a content stream.

FIG. 3 illustrates a third-person perspective view of gameplay in a game environment, represented by a frame 300. Frame 300 is part of a content stream that corresponds to the gameplay. Notably, a content stream can include any number of frames while a collection/aggregation of frames forms a respective content stream. Here, frame 300 illustrates the third person perspective view of a character 305 and graphically shows various features or gameplay attributes. As shown, the features include a health/status 310 (which may also represent a gameplay status), an equipment list or inventory 315, a currently selected weapon 316, a number of points 320, structures or buildings 325 (e.g., here, a castle), and the like. Notably, the features of frame 300 can also include sounds, colors or color palettes, feedback (e.g., haptic feedback, etc.), and the like. Collectively, the features of frame 300 provide important context for describing a content stream (which includes a number of frames) and further, the features provide a foundation for defining dimensions in a vector-space framework discussed in greater detail herein.

Figure 4:
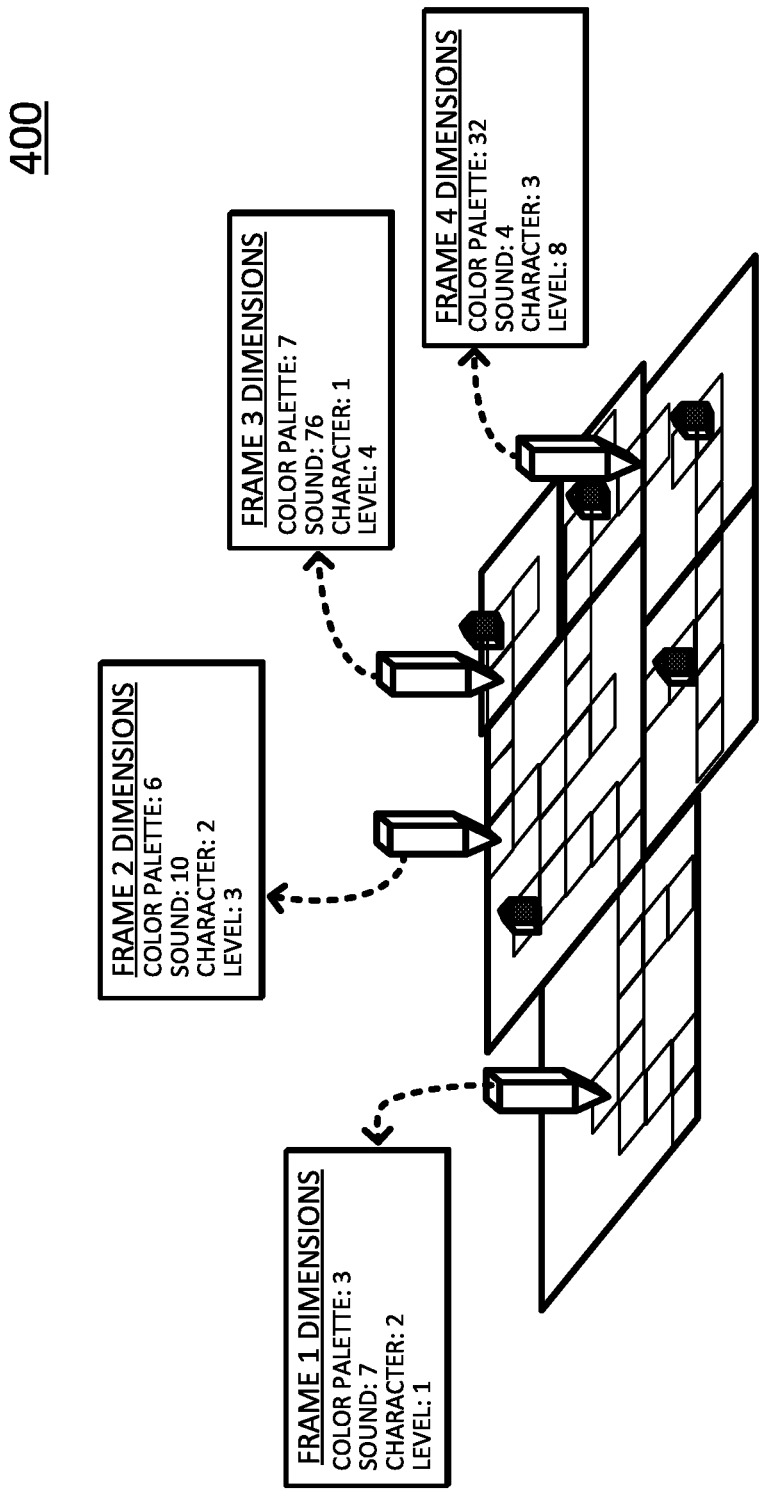
FIG. 4 illustrates a schematic diagram of a gameplay map, showing frames associated with areas in the game environment.

FIG. 4 illustrates a schematic diagram of a gameplay map 400, showing frames—e.g., labeled as frame "1", "2", "3", and "4"—corresponding to locations in the game environment. As mentioned above, the frames are associated with features, which (as shown), include colors indicated by the "color palette" feature, sounds, character selection, and levels. Gameplay map 400 particularly illustrates changes for feature-values corresponding to these features when, for example, a player moves between different areas or locations in the game environment.

As is appreciated by those skilled in the art, an area or a location in the game environment may be represented by multiple frames which typically include similar feature-values for a given set of features. For example, the game environment for a particular area, such as a room in a house, will often have similar feature-values for frames representing the room. That is, gameplay content for users in the room will often share similar features even if the underlying frames show different views of the same room. Accordingly, despite slight nuances (shown by different views of the room), the underlying frames and associated feature-values for a given set of feature will be similar (e.g., similar colors, hues, sounds, objects in the room, and the like). In this fashion, frames with the same or similar feature-values for a given set of features may be assigned to or grouped within an area and/or a location in the game environment. It should be noted, the features and feature-values shown in FIG. 4 are provided for purposes of discussion, not limitation. Any number of features discussed herein may be included or excluded (as desired).

Figure 5:
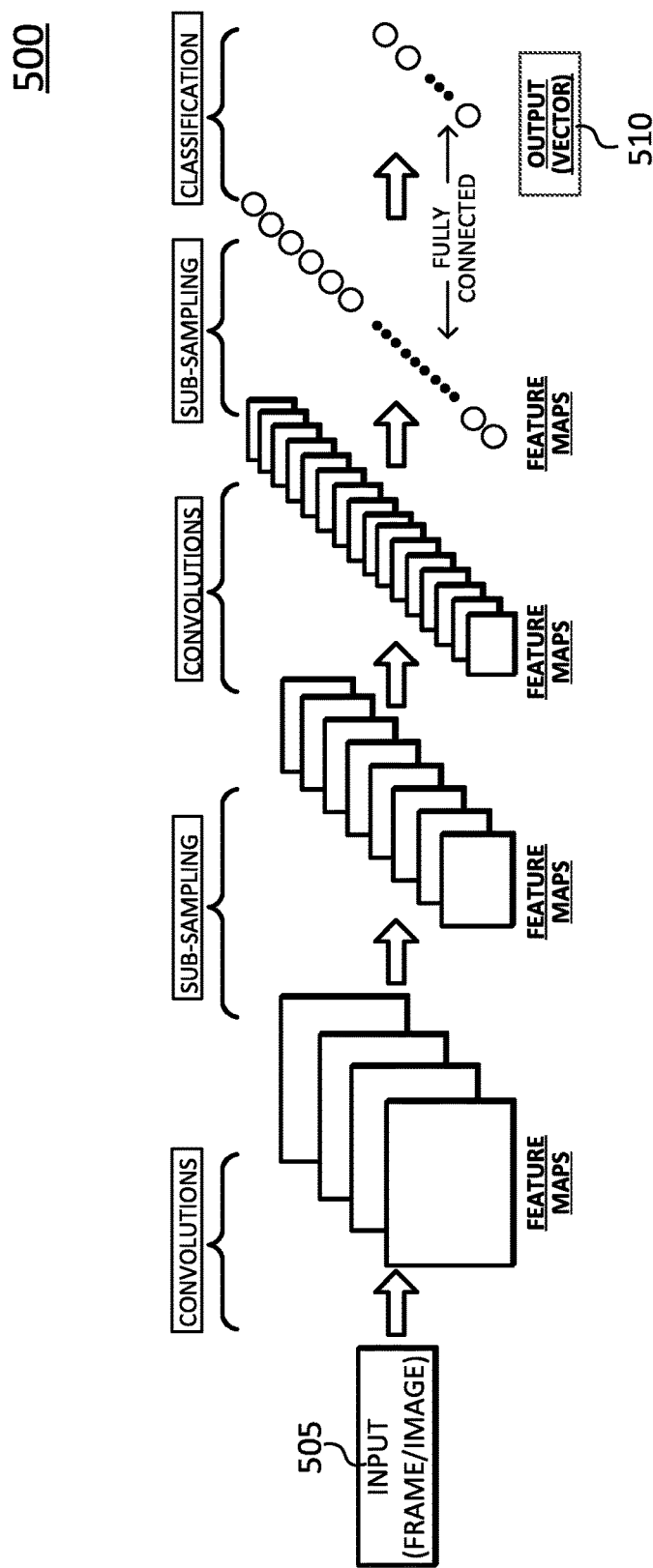
FIG. 5 illustrates a schematic diagram of an example convolutional neural network (CNN)

FIG. 5 illustrates a schematic diagram of a convolutional neural network (CNN) 500. CNN 500 generally represents a machine learning network and includes convolutional layers and interconnected neurons that learn how to convert input signals (e.g. images, pictures, frames, etc.) into corresponding output signals (e.g. a position vector in a vector-space).

CNN 500 may used, for example, to extract features and corresponding feature-values for the frames in a content stream. In operation, CNN 500 receives an input signal such as a frame/image 505 and performs a convolution process on frame/image 505. During the convolution process, CNN 500 attempts to label frame/image 505 with reference to what CNN 500 learned in the past—if frame/image 505 looks like previous frame/image previously characterized, a reference signal for the previous frame/image will be mixed into, or convolved with, the input signal (here, frame/image 505). The resulting output signal is then passed on to the next layer. CNN 500 also performs sub-sampling functions between layers to "smooth" output signals from prior layers, reduce convolutional filter sensitivity, improve signal-to-noise ratios, and the like. Sub-sampling is typically achieved by taking averages or a maximum over a sample of the signal.

Generally, convolutional processes are translational invariant and, intuitively, each convolution (e.g., each application of a convolution filter) represents a particular feature of interest (e.g., a shape of an object, a color of a room, etc.). CNN 500 learns which features comprise a resulting reference signal. Notably, the strength of an output signal from each layer does not depend on where the features are located in frame/image 505, but simply whether the features are present. Thus, CNN 500 can co-locate frames showing different views of a given area/location in the gameplay environment.

After multiple convolutions and sub-sampling steps, the convolved/sub-sampled signal is passed to a fully connected layer for classification, resulting in an output vector 510. Fully connected, as is appreciated by those skilled in the art, means the neurons of a preceding layer are connected to every neuron in the subsequent layer. Notably, CNN 500 also includes feedback mechanisms (not shown) which typically include a validation set to check predictions and compare the predictions with the resultant classification. The predictions and prediction errors provide feedback and are used to refine weights/biases learned. CNN 500 represents a general convolutional neural network and may include (or exclude) various other layers, processes, operations, and the like, as is appreciated by those skilled in the art.

Figure 6:
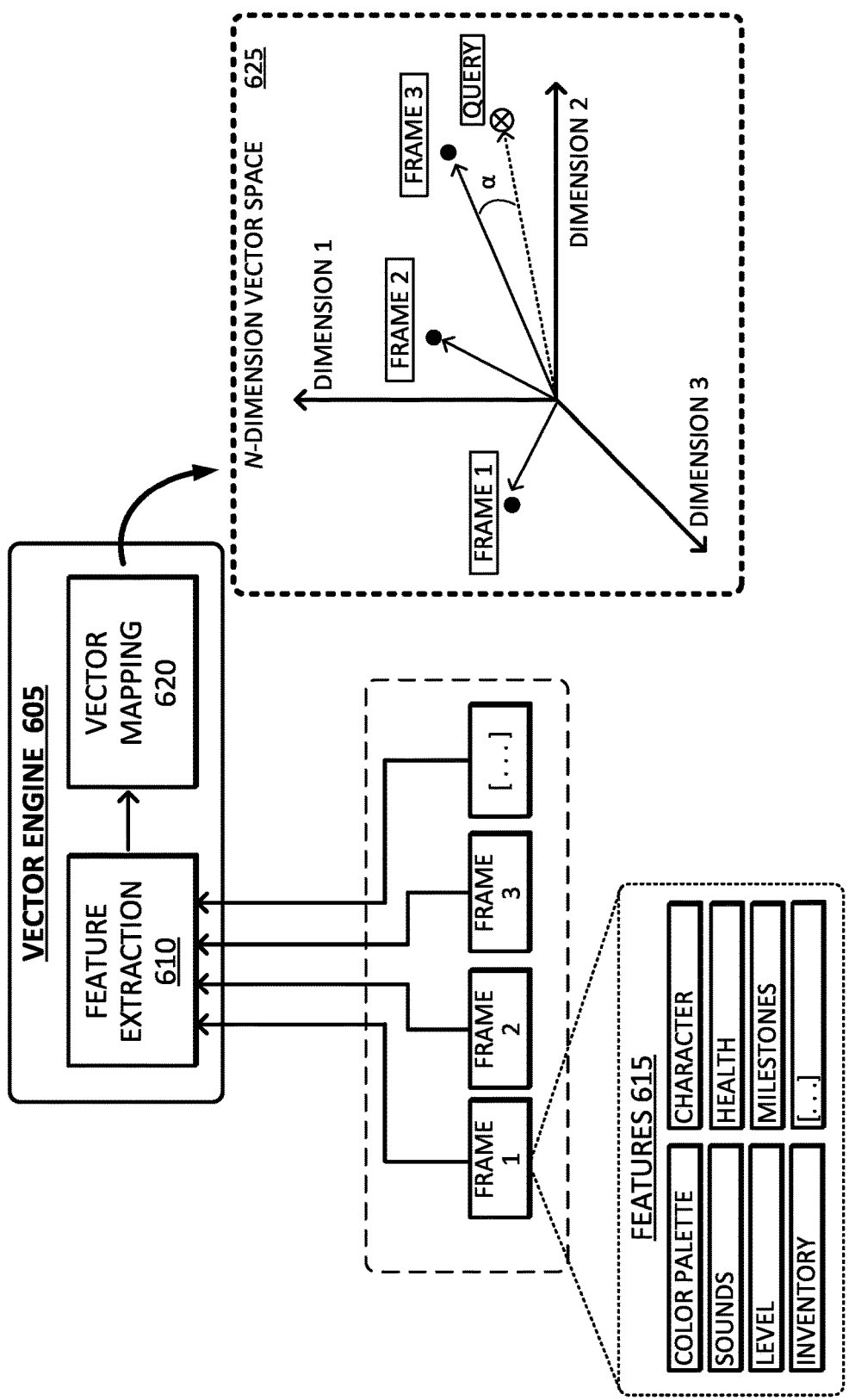
FIG. 6 illustrates a block diagram of a vector engine, showing a vector extraction module and a vector mapping module.

FIG. 6 illustrates a block diagram of a vector engine 605 that includes a feature extraction module 610 and a vector mapping module 620. Vector engine 605 may represent device 200 (or portions thereof) and may further operate in conjunction with CNN 500 to extract feature-values for one or more features 615 associated with frames—here, frames 1-3—for a corresponding content stream. In particular, vector engine 605 monitors frames from content streams such as the illustrated frames 1-4. For example, client devices (e.g., client devices 130 shown in FIG. 1) can generate content streams for gameplay in a game environment and communicate such content streams over a network (e.g., network 105). Vector engine 605 monitors these content streams over the communication network and extracts features using feature extraction module 610. Feature extraction module particularly extracts features and corresponding feature-values from frames 1-3 for respective content streams. These features can include, for example, the illustrated features 615 such as a color palette, sounds, level, inventory, and the like.

Feature extraction module 610 passes extracted features/feature-values to vector mapping module 620 which further maps a content stream and/or a frame corresponding to the content stream to a respective position vector in a vector-space based on the extracted features/feature-values. Here, the vector-space is represented by an N-dimension vector-space 625 that includes dimensions corresponding to the features, where a position vector is mapped according to its respective feature-value(s). For example, dimension 1 may correspond to the color palette feature, dimension 2 may correspond to the sounds feature, dimension 3 may correspond to the health feature, and so on. Typically, one dimension corresponds to one feature, however, it is appreciated that any number of dimensions and any number of features may by mapped, as appropriate. In this fashion, vector engine 605 monitors frames for a content stream and maps the frames and/or the content streams (represented by the frames) to a position vector in a vector-space framework.

N-dimension vector-space 625 also shows a "query" position vector in close proximity to frame 3, indicated by a distance and an angle α. As discussed in greater detail below, the techniques herein establish a vector-space framework (e.g., N-dimension vector-space 625) and evaluate gameplay content according to the vector-space. For example, the techniques evaluate frames for a content-stream in terms of its respective position vectors in the vector-space. Evaluating the frames can include assigning position vectors to areas and/or locations in the game environment, determining a user location in the game environment based on features/feature-values extracted from user frames and proximately located position vectors, establishing criteria for storing, indexing, prioritizing, and/or ranking content streams, searching for relevant content streams based on proximate position vectors, and the like.

FIG. 7 illustrates a schematic diagram of a vector-space 700, showing position vectors assigned to on one or more areas (areas 1-4) in the game environment. As shown, each dimension of vector-space 700 corresponds to a respective feature and the position vectors are mapped according to feature-values for each dimension/feature. Vector-space 700, similar to the representative vector-space 625, is generated from vector engine 605 where, as discussed, vector engine 605 extracts features/feature-values from frames for a content stream and maps position vectors to respective frames/content streams.

As mentioned, vector engine 605 assigns one or more sets or groups of closely located position vectors to areas in the game environment. Typically, these areas in the game environment define one or more locations or positions in the game environment, and a number of frames may represent the same area/location in the game environment where feature-values for these frames are often the same or substantially similar. In terms of vector-space 700, these same or substantially similar feature-values are indicated by proximately located position vectors grouped or assigned to an area/location (e.g., one of areas 1-4) in the game environment. Notably, the position vectors in vector-space 700 may be initially generated from content streams of pre-release test data and may define an initial set of gameplay transitions as well as establish transition thresholds, discussed in greater detail below.

Vector-space 700 may also be used to determine a user location in the game environment. For example, vector engine 605 extracts features/feature-values from user frames for a user content stream. Vector engine 605 maps a position vector to at least one of the user frames, represented by the query vector 710. Vector engine 605 identifies the closest position vectors with respect to query vector 710 by analyzing relative distance and angles between the position vectors in vector-space 700. Here, vector engine 605 determines the user location as a location within area 1. In some embodiments, the vector-space may simply indicate zones or areas as corresponding to locations in the game environment. In such embodiments, vector engine 605 determines the user location by identifying the closest zone or area in the vector-space (rather than identifying proximate position vectors). In this fashion, vector-space 700 provides a framework to determine a user location based on features/feature-values extracted from user frames for a user content stream.

Figure 8A:
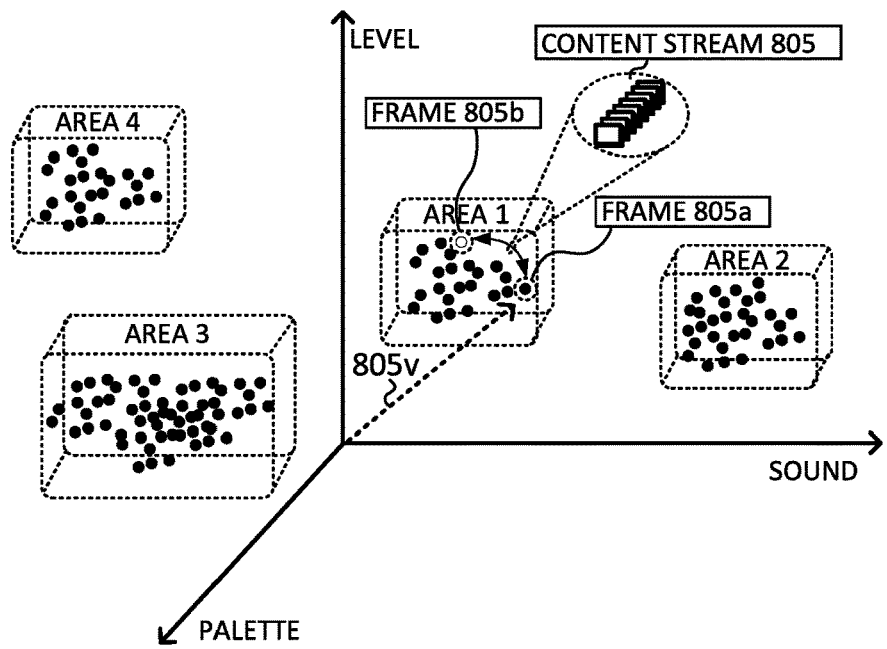
FIG. 8A illustrates a schematic diagram of the vector-space shown in FIG. 7, further showing a gameplay transition between locations in the game environment.
Figure 8B:
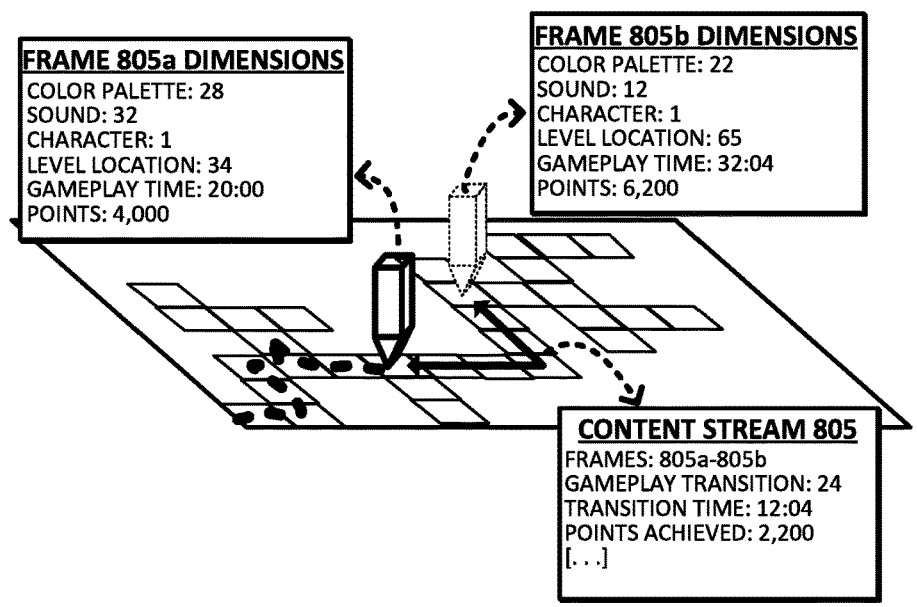
FIG. 8B illustrates a schematic diagram of a gameplay map that corresponds to the gameplay transition shown in FIG. 8A.

FIGS. 8A and 8B collectively illustrate a gameplay transition, showing a change between locations in the game environment. Specifically, FIG. 8A illustrates a schematic diagram of vector-space 700 showing a gameplay transition represented by content stream 805. Content stream 805 comprises a number of frames, which include an initial frame 805*a* and an end or terminal frame 805*b*. As shown, initial frame 805*a* and terminal frame 805*b* represent a first and a last frame, respectively, of the gameplay transition and the gameplay transition represents a change between game environment locations, as indicated by two different position vectors.

Vector engine 605 is operable to map content stream 805 to one or more position vectors based on its underlying content frames—namely, initial frame 805*a* and/or terminal frame 805*b*. As shown, content stream 805 is mapped to a vector 805*v* that points to a position vector corresponding to initial frame 805*a*. In this fashion, content stream 805 is indexed or stored according to initial frame 805*a*. However, it is also appreciated content stream 805 can be mapped to any number of position vectors corresponding to any number of its underlying frames such that portions of the gameplay transition may be mapped to respective position vectors. In this fashion, vector-space 700 represents a framework for organizing content streams according to areas and/or locations in the game environment.

FIG. 8B illustrates a schematic diagram of a gameplay map 801 that provides game environment context for the vector-space transition shown in FIG. 8A. Gameplay map 801 particularly illustrates a gameplay transition for a character moving between map spaces on gameplay map 801, which spaces correspond to locations in the gameplay environment. As shown, vector engine 605 indexes or assigns content stream 805, which comprises frames 805*a*-805*b*, to "gameplay transition 24", which includes a transition time of 12:04 with 2,200 points achieved during the transition. Gameplay transition 24 is defined by changes in feature-values for the features associated with frames for content stream 805—e.g., color palette, sound, level location, gameplay time, and points. Notably, vector engine 605 calculates some of these changes based on differences between the feature-values, as is appreciated by those skilled in the art. Further, the identifier "gameplay transition 24" may be a general identifier that represents any number of related transitions between specific locations in the game environment.

In some embodiments a user may wish to create a content stream to serve as a walk through for a particular gameplay transition. In such embodiments, the vector engine 605 receives a request (e.g., a walk through mode request) and begins monitoring user frames that will eventually form the content stream for the gameplay transition. Vector engine 605 determines feature-values/features for the frames and identifies the gameplay transition (or gameplay transitions) based on changes, as discussed above. Upon completion of the gameplay transition(s) and/or upon termination of the walk-through mode by the user, vector engine 605 selects the user frames or sets of the user frames to form the content stream for a transition, and maps the content stream to a position vector (e.g., based on an initial frame for the content stream). As discussed in greater detail below, vector engine 605 may further evaluate the content stream prior to mapping to the position vector to determine if the content stream meets certain minimum standards indicated by one or more thresholds (e.g., transition time thresholds, point value thresholds, etc.).

Figure 9A:
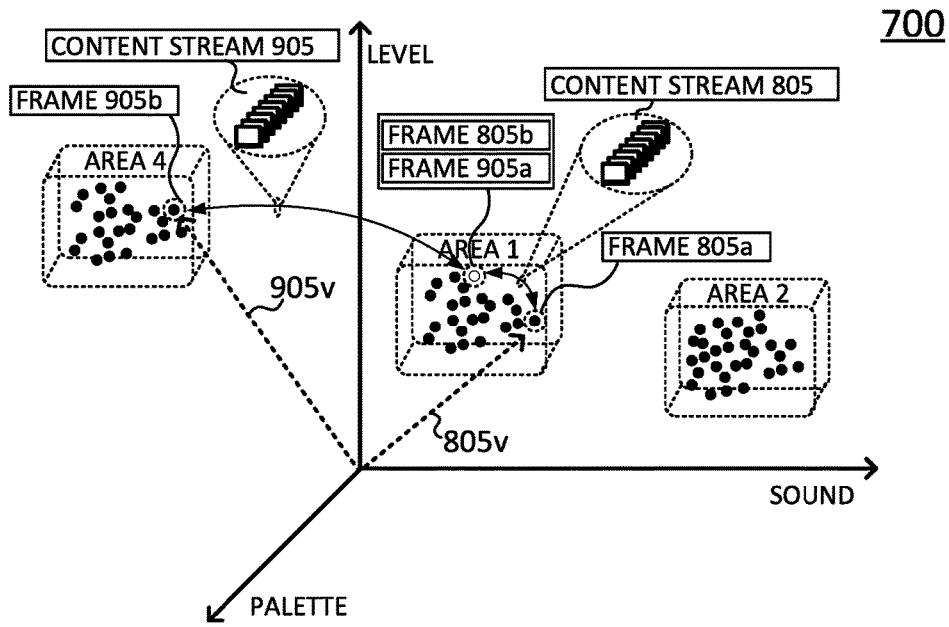
FIG. 9A illustrates a schematic diagram of the vector-space shown in FIG. 7, further showing multiple gameplay transitions in the game environment.
Figure 9B:
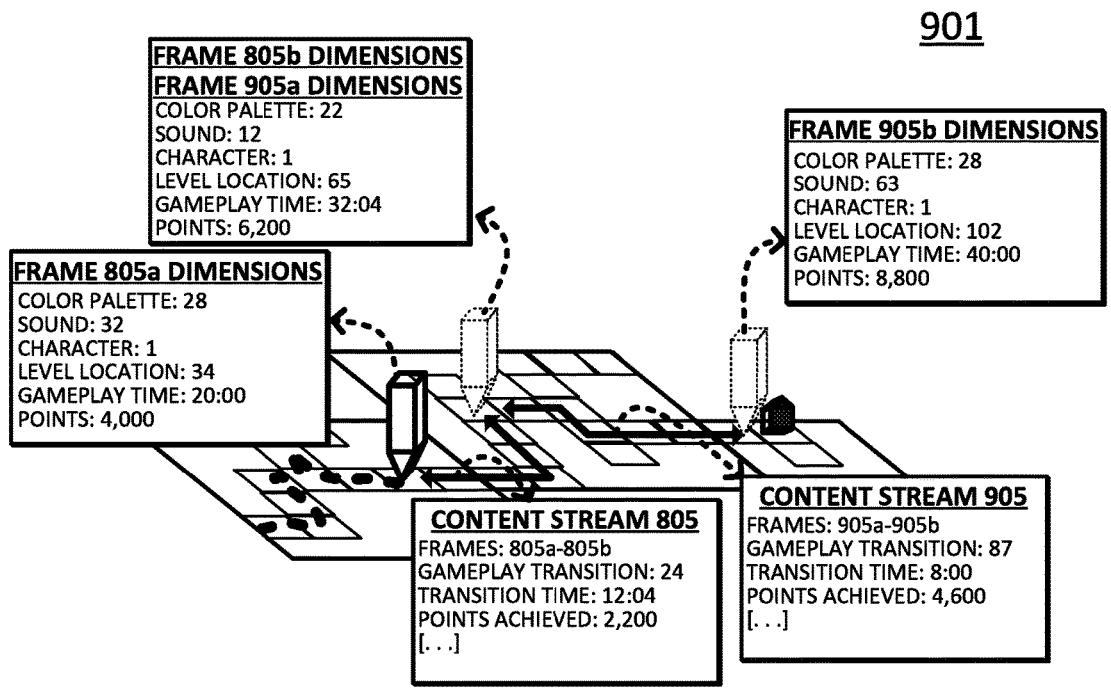
FIG. 9B illustrates a schematic diagram of a gameplay map that corresponds to the multiple gameplay transitions shown in FIG. 9A.

FIGS. 9A and 9B collectively illustrate multiple gameplay transitions in the game environment. Specifically, FIG. 9A illustrates vector-space 700 with a first gameplay transition represented by content stream 805 (corresponding to vector 805*v*) and a second gameplay transition represented by content stream 905 (corresponding to vector 905*v*).

Content stream 905, similar to content stream 805 (discussed above), comprises a number of frames, including an initial frame 905*a*, which may be the same frame as terminal frame 805*b*, and a terminal frame 905*b*. Here, initial frame 905*a* and terminal frame 905*b* represent a first and a last frame for the gameplay transition and the gameplay transition indicates movement between locations or areas in the game environment, e.g., between area 1 and area 4.

FIG. 9B illustrates a schematic diagram of a gameplay map 901 that provides game environment context for the gameplay transitions shown in FIG. 9A. Gameplay map 901 particularly illustrates a gameplay transition 24 corresponding to content stream 805, and a gameplay transition 87 corresponding to content stream 905. Gameplay transition 87 particularly indicates a transition time of 8:00 with 4,600 points achieved during the gameplay transition. As mentioned, vector engine 605 is operable to evaluate features/feature-values for frames of a content stream and, as shown here, vector engine 605 calculates the transition time and the points achieved based on differences between the features/feature-values for content frames of content stream 905. Gameplay transition 24 for content stream 805 and gameplay transition 87 for content stream 905 identify different content streams, however, it is appreciated that content streams 805 and 905 may form part of a larger content stream such that content streams 805/905 represent segments or portions thereof. In this fashion, a single content stream may comprise multiple gameplay transitions; each indexed or mapped to a respective position vector in vector-space 700.

With respect to the content streams for each transition, vector engine 605 is also operable to define a content stream by selecting a set of frames that correspond to a gameplay transition. For example, vector engine 605 identifies a number of frames for a content stream and the number of frames may correspond to multiple transitions (or portions thereof). Vector engine 605 maps at least a portion of the number of frames to respective vector positions and evaluates the respective vector positions based on assigned areas/locations for proximate position vectors. Vector engine 605 further selects a set of the frames corresponding to one or more vector positions to represent a given gameplay transition. For example, referring again to FIGS. 9A and 9B, vector engine 605 selects initial frame 805*a*, terminal frame 805*b*, and any frames there-between to form content stream 805, which represents gameplay transition 24. Similarly, vector engine selects initial frame 905*a*, terminal frame 905*b*, and any frames there-between to form content stream 905, which represents gameplay transition 87. Vector engine 605 typically selects the frames based on parameters for the gameplay transition. For example, the gameplay transition may be defined by parameters such as moving between locations, areas, levels, defeating opponents in the game environment, achieving a milestone, increasing an inventory, and the like.

Figure 10A:
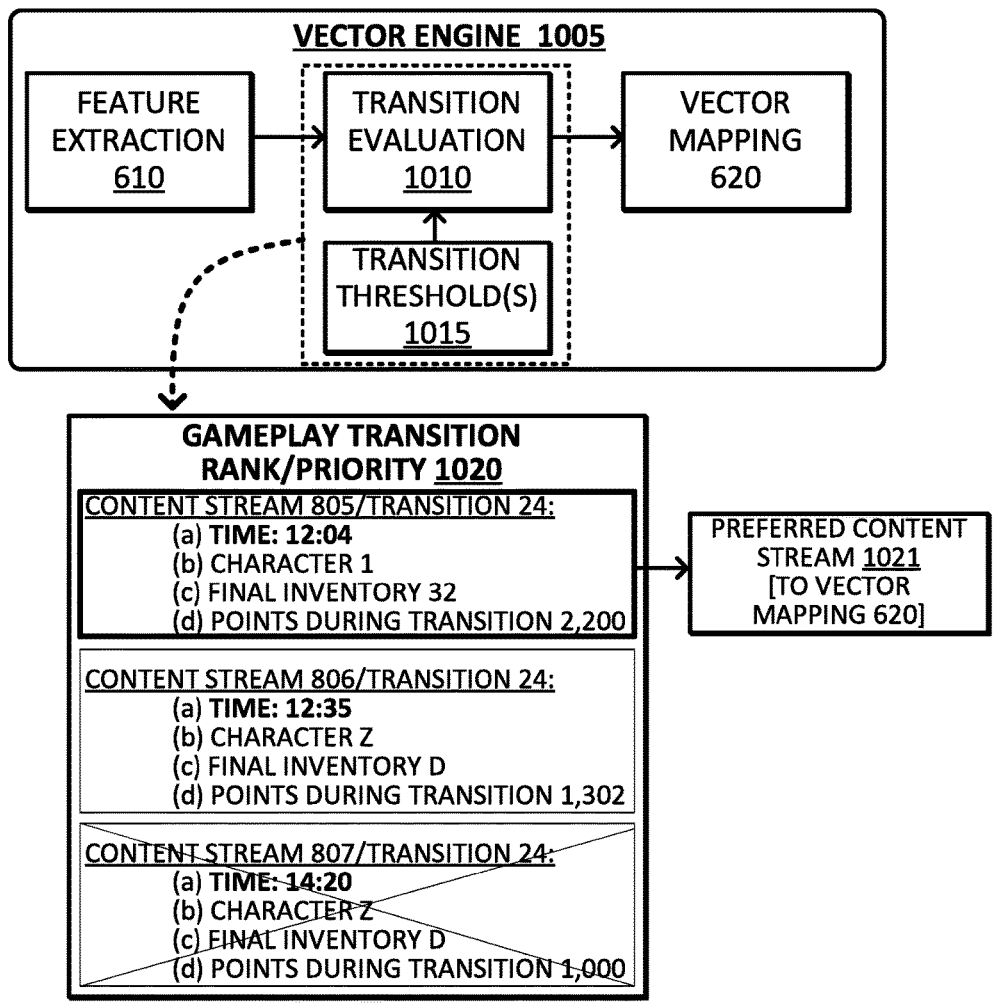
FIG. 10A illustrates a block diagram of another embodiment of a vector engine, showing a transition evaluation module and one or more transition thresholds.

FIG. 10A illustrates a block diagram of another embodiment of a vector engine 1005 that includes a transition evaluation module 1010 as well as one or more transition thresholds 1015. Vector engine 1005 is similar to and incorporates certain modules of vector engine 605, discussed above, and performs similar operations—e.g., extracts features/feature-values, maps frames/content streams to respective position vectors in the vector-space, etc.

In addition to the modules of vector engine 605, vector engine 1005 includes a transition evaluation module 1010, which operates as a filter prior to vector mapping module 620. Transition evaluation module 1010 analyzes gameplay transitions in the game environment and selects a content stream as a preferred content stream 1021 for a particular gameplay transition based on one or more transition threshold(s) 1015 and/or a gameplay rank/priority 1020. Transition threshold(s) 1015 and gameplay rank/priority 1020 indicate a preference for one or more features and/or one or more gameplay metrics. As used herein, the term gameplay metric encompasses and includes first order features such as those specifically associated with respective frames for a content stream as well as higher order features/criteria not specifically associated with a frame. For example, a feature for a frame can include a gameplay time, while the gameplay metric can include a threshold gameplay metric (e.g., a threshold time) measured by differences in the gameplay time between multiple frames—e.g., a total time, average (or mean) time, and/or a median time measured between initial and terminal frames. In addition the gameplay metric can also include other features that indicate popularity (e.g., a number of votes, a number of views, a value associated with the player that created a content stream, and the like).

Transition threshold 1015, as shown, provides a threshold transition time such that gameplay transitions that exceed the threshold time (e.g., 14:00) are filtered/discarded prior to vector mapping module 620. In addition, vector engine 1005 further ranks or assigns a priority to each gameplay transition shown by a table-gameplay transition rank/priority 1020. The rank/priority value for each gameplay transition here indicates a preference for a lower or quicker transition time. In this example, content stream 805 is selected as a preferred content stream 1021 for gameplay transition 24 because it has the fastest or lowest transition time of 12:04. Other content streams, such as content stream 806 and content stream 807 include slower or higher transitions times of 12:35 and 14:20, respectively, for gameplay transition 24. Further, content stream 807 is marked with an "X" because its transition time of 14:20 exceeds a transition time threshold (e.g., 14:00). In this fashion, transition evaluation module 1010 filters content streams for a transition based on transition thresholds 1015 and selects specific content streams to map in the vector-space based on a priority/rank 1020.

While in the above example the transition threshold and rank/priority indicate a preference for a quicker/lower transition time, it is appreciated any gameplay metric may be used to filter and/or rank gameplay transitions. For example, gameplay transitions may be evaluated according to a gameplay status, a number of points, an inventory, a character selection, a health of a character, a sound, a color palette, a level, a position, a gameplay milestone, and so on.

Figure 10B:
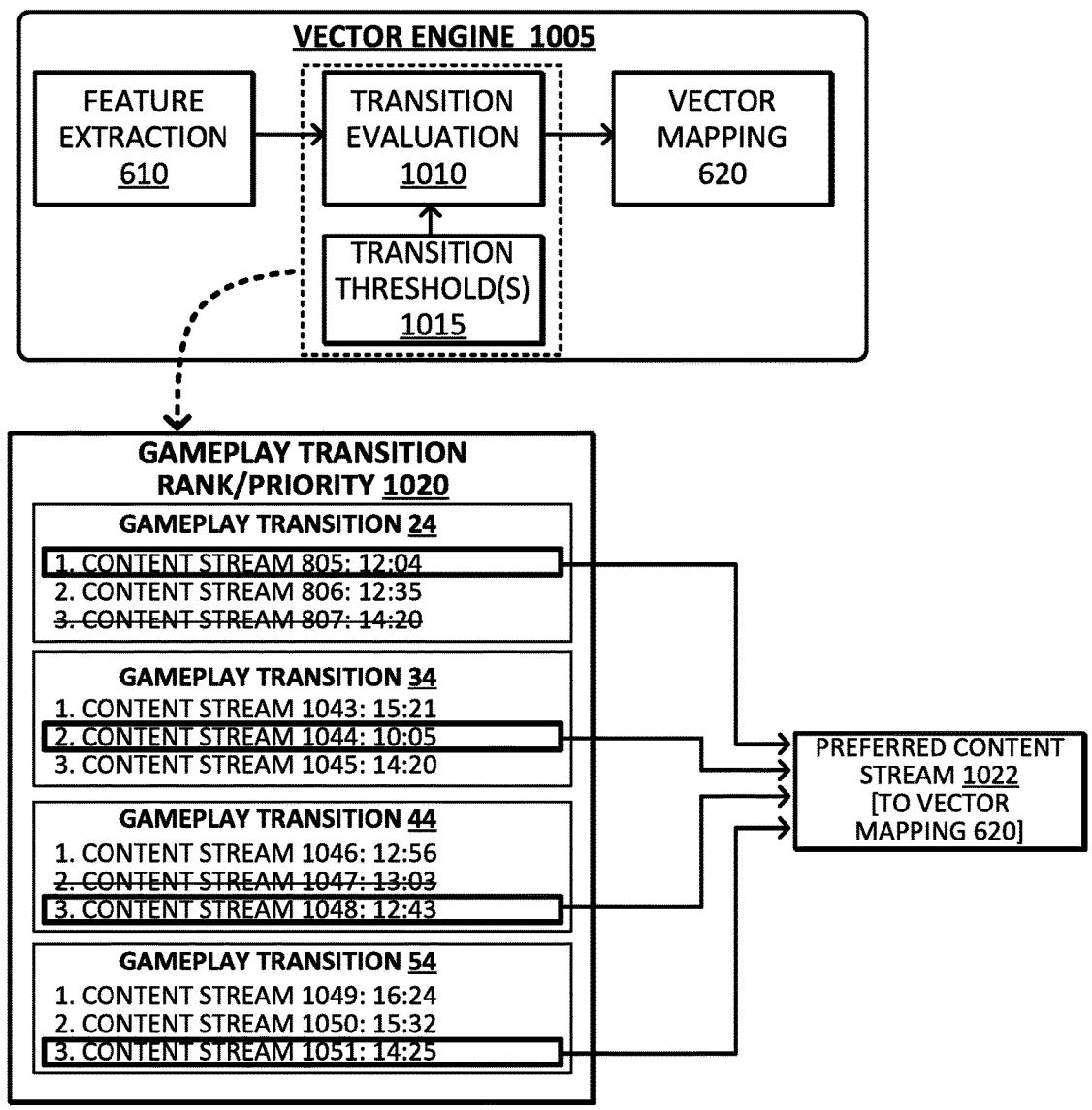
FIG. 10B illustrates a block diagram of another embodiment of the vector engine shown in FIG. 10A, showing multiple gameplay transitions compiled into a preferred content stream.

FIG. 10B illustrates a block diagram of another embodiment of vector engine 1005, showing vector engine 1005 compiling or aggregating content streams for multiple gameplay transitions into one preferred content stream 1022. As mentioned, a single content stream may include multiple gameplay transitions and as shown, vector engine 1005 selects a preferred content stream for each gameplay transition 24, 34, 44, and 54, and compiles the preferred content streams into a single preferred content stream 1022.

Vector engine 1005 further prioritizes content streams for a given gameplay transition according to respective transition times, with a preference for a faster or lower transition time. The gameplay transitions particularly include gameplay transition 24, comprising content streams 805-807, a gameplay transition 34, comprising content streams 1043-1045, a gameplay transition 44, comprising content streams 1046-1048, and a gameplay transition 54, comprising content streams 1049-1051. Notably, in some embodiments, the transition threshold 1015 may be different for each gameplay transition. Vector engine 1005 further selects one content stream for each gameplay transition, and aggregates each content stream into preferred content stream 1022. Preferably, vector engine 1005 maps each selected content stream to a respective position vector in the vector-space such that preferred content stream 1022 is indexed or bookmarked by multiple position vectors in the vector-space.

While FIGS. 10A and 10B describe vector engine 1005 operations to select one content stream as a preferred content stream (FIG. 10A) or select one content stream for each gameplay transition (FIG. 10B), it is appreciated vector engine 1005 may select any number of content streams as preferred content streams.

Collectively, FIGS. 10A and 10B illustrate operations to create a vector-space of vector positions for content streams, where the vector positions map to underlying frames for a given content stream. This vector-space establishes a framework to evaluating gameplay content in the game environment where each dimension of the vector-space corresponds to a feature (and/or a gameplay metric). For example, as discussed above, the vector-space may be used to filter and rank content streams such that preferred content streams are mapped to the vector-space while other content streams are discarded (e.g., for failing to satisfy threshold conditions). Notably, this vector-space may be initially created using pre-release test gameplay and further, the pre-release testing gameplay may establish baseline transition conditions or transition thresholds. For example, in the context of the game environment, an initial set of gameplay transitions can represent content streams from multiple users as a selected character moves from a first level to a second level. The gameplay transitions from the multiple users are compiled and statistically analyzed to determine a threshold transition condition—e.g., a threshold transition condition can include a transition time corresponding to a character moving from the first level to the second level. As is appreciated by those skilled in the art, the transition time can include an average or mean time, a median time, a total time, and so on.

Figure 11A:
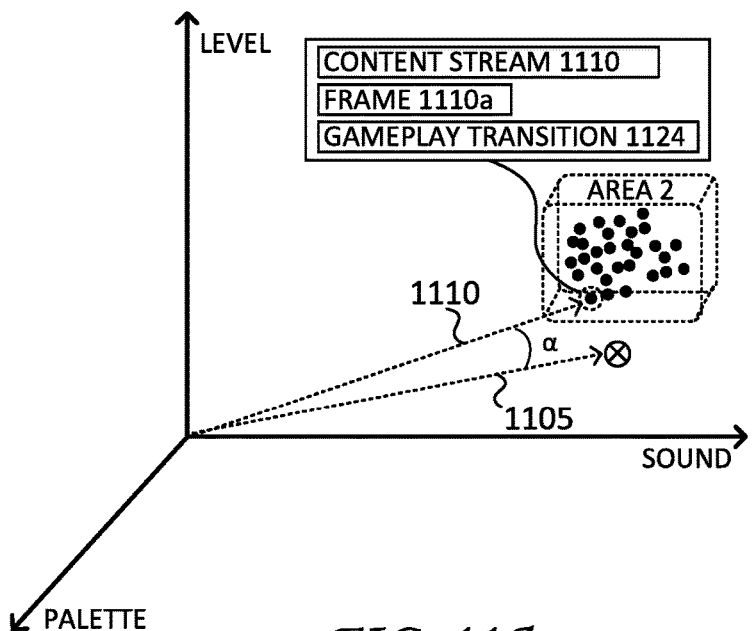
FIG. 11A illustrates a schematic diagram of a vector-space, showing position vectors assigned to an area and in proximity to a query vector.
Figure 11B:
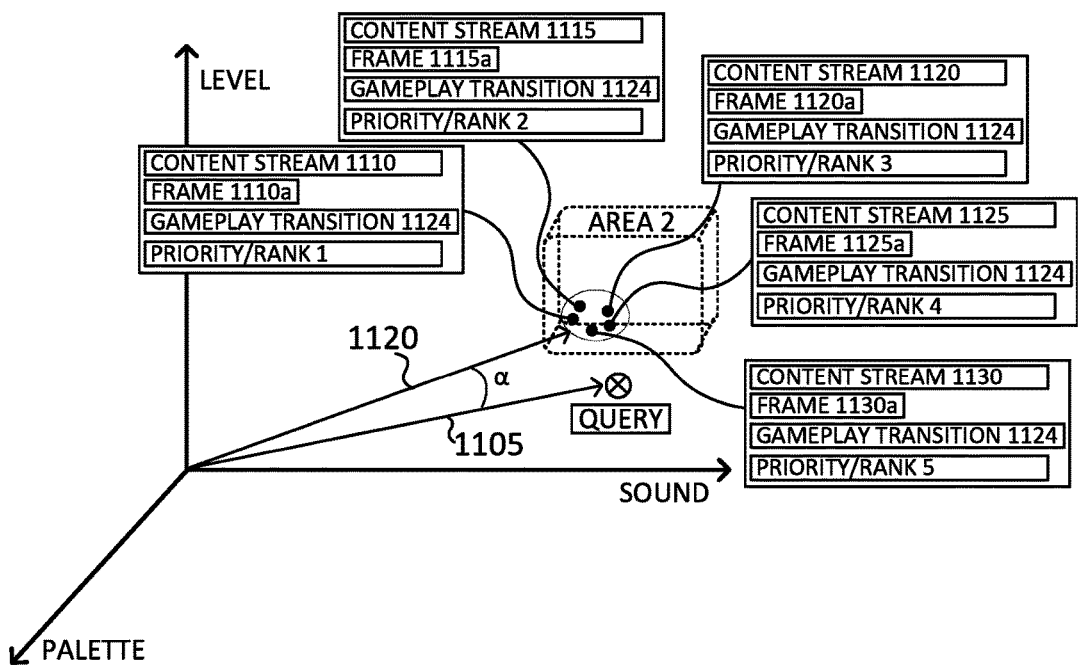
FIG. 11B illustrates a schematic diagram of the vector-space of FIG. 11A, further showing content streams relevant to the query vector.

FIGS. 11A and 11B illustrate techniques to identify relevant content for a query vector 1105 based on proximity between query vector 1105 and one or more position vectors mapped to content streams/transitions in a vector-space 1100.

In particular, with reference to FIG. 11A, vector engine 1005 initially establishes a framework, here a vector-space 1100, to evaluate subsequent frames/content streams. As mentioned, vector engine 1005 monitors frames for content streams, extracts features/feature-values, and maps position vectors for the content streams in vector-space 1100. Further, vector engine 1005 assigns sets or groups of position vectors in close proximity to areas/locations in the game environment—here, area 2.

Vector engine 1005 uses vector-space 1100 to search for relevant content streams with respect to a user query, represented by query vector 1105. In the context of a game environment, a user may request or search for gameplay content such as a walk-through content to assist completing a gameplay transition (e.g., defeating an opponent, advancing to a new level, obtaining additional inventory, etc.). In such situations, the user may send a request for relevant gameplay content to vector engine 1005. Vector engine 1005 receives the request and monitors user frames for a current user content stream. Notably, vector engine 1005 may continuously monitor the user content stream during gameplay to improve response times relative to a request (e.g., by caching frames for the last 15 seconds of gameplay, etc.).

Vector engine 1005 extracts user features/feature-values from the current user content stream (e.g., one of the user frames in the current user content stream) and maps the current user content stream to a user vector—e.g., query vector 1105. Vector engine 1005 evaluates the query vector 1105 in the vector-space to determine a next-closest or a proximate position vector for a relevant content stream/transition. Here, vector engine 1005 identifies content stream 1110 as the relevant content stream for gameplay transition 1124 based on a position vector mapped to an initial frame 1105a for content stream 1110.

FIG. 11B illustrates vector engine 1005 identifying multiple content streams as relevant content streams for gameplay transition 1124 in vector-space 1100. In particular, vector engine 1005 determines content streams 1110, 1115, 1120, 1125, and 1130 as relevant to gameplay transition 1124 (and relevant to query vector 1105) based on position vectors mapped to the respective content streams and their proximity to query vector 1105. Here, vector engine 1005 further assigns a priority or a rank to each content stream based on respective feature-values for features associated with the content streams. For example, as discussed above, vector engine 1005 can rank the relevant content streams based on a transition time for gameplay transition 1124. However, it is also appreciated any combination of features/feature-values may be weighted or prioritized as appropriate.

Figure 12:
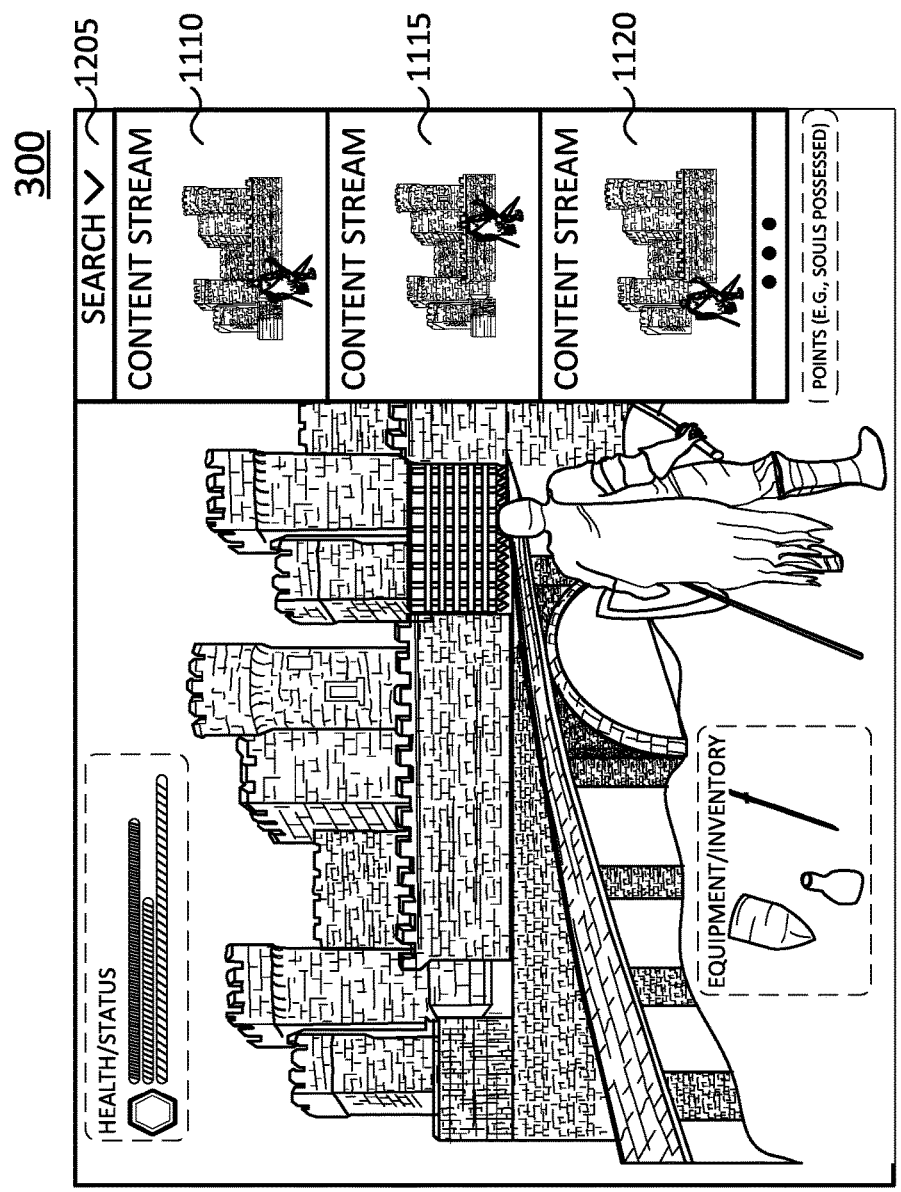
FIG. 12 illustrates the third-person perspective view of gameplay shown in FIG. 3, further showing portions of relevant content streams for a current gameplay transition.

FIG. 12 illustrates the third-person perspective view of gameplay in the game environment shown in FIG. 3, further showing portions of relevant content streams for a current gameplay transition. Here, the content streams include the above-discussed content streams 1110, 1115, and 1120, where each content stream is represented by an image or thumbnail. FIG. 12 also shows an example search feature 1205, which a user can interact with to cause vector engine 1005 to execute the search functions discussed above. Importantly, the relevant content streams are presented according to respective rank or priority, such that content stream 1110 is displayed first or at a top portion of frame 300, content stream 1110 is displayed second or directly below content stream 1110, and so on.

Figure 13:
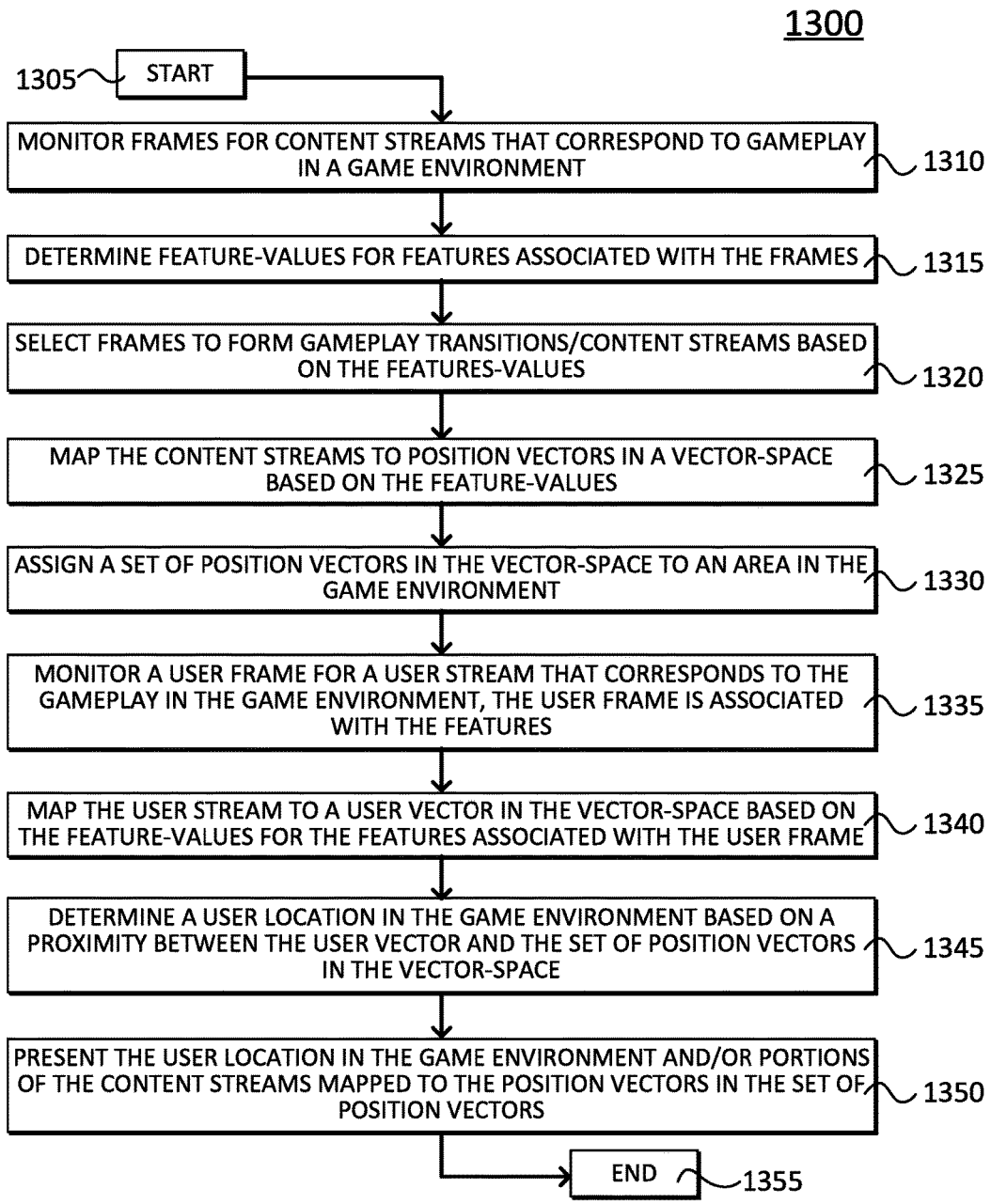
FIG. 13 illustrates an example simplified procedure for evaluating gameplay in a game environment.

FIG. 13 illustrates an example simplified procedure 1300 for evaluating gameplay in a game environment. Procedure 1300 is particularly described with respect to a vector engine (e.g., vector engine 605 and/or vector engine 1005) performing certain operations, however it is appreciated such operations are not intended to be limited to the vector engine and further such discussion is for purposes of illustration, not limitation.

Procedure 1300 begins at step 1305 and continues to step 1310 where, as discussed above, the vector engine monitors frames for content streams that correspond to gameplay in a game environment. The vector engine determines, at step 1315, feature-values for features associated with the frames and selects, at step 1320, frames to form content streams representing gameplay transitions in the game environment. Next, in step 1325, the vector engine maps the content streams in a vector-space based on the feature-values for underlying frames. In performing these steps, the vector engine particularly evaluates the frames for respective content streams and selects certain frames for gameplay transitions (e.g., preferred content streams) based on threshold conditions/transition thresholds, as discussed above.

The vector engine also uses the vector-space to determine a user location in the game environment based on user frames for a user content stream. In particular, in step 1330, the vector engine assigns a set of position vectors in the vector-space to an area or location in the game environment and, in step 1335, the vector engine monitors a user frame for a user stream. The vector engine maps, in step 1340, the user stream to a user vector (e.g., query vector 710) based on features/feature-values extracted from the user frame. The vector engine analyzes relative distances and/or angles between the position vectors in the vector-space to determine, in step 1345, the user vector is proximate to the area/location assigned to other position vectors. Thus, the vector engine determines the user location based on the area/location assigned to the other position vectors. The vector engine further presents, in step 1350, the user location in the game environment and/or portions of the content streams mapped to the position vectors in the set of position vectors.

Procedure subsequently ends in step 1355, but may continue on to step 1310 where the vector engine monitors frames for content streams. Collectively, the steps in procedure 1300 describe techniques to evaluate gameplay in a game environment using a framework defined in a vector-space.

Figure 14:
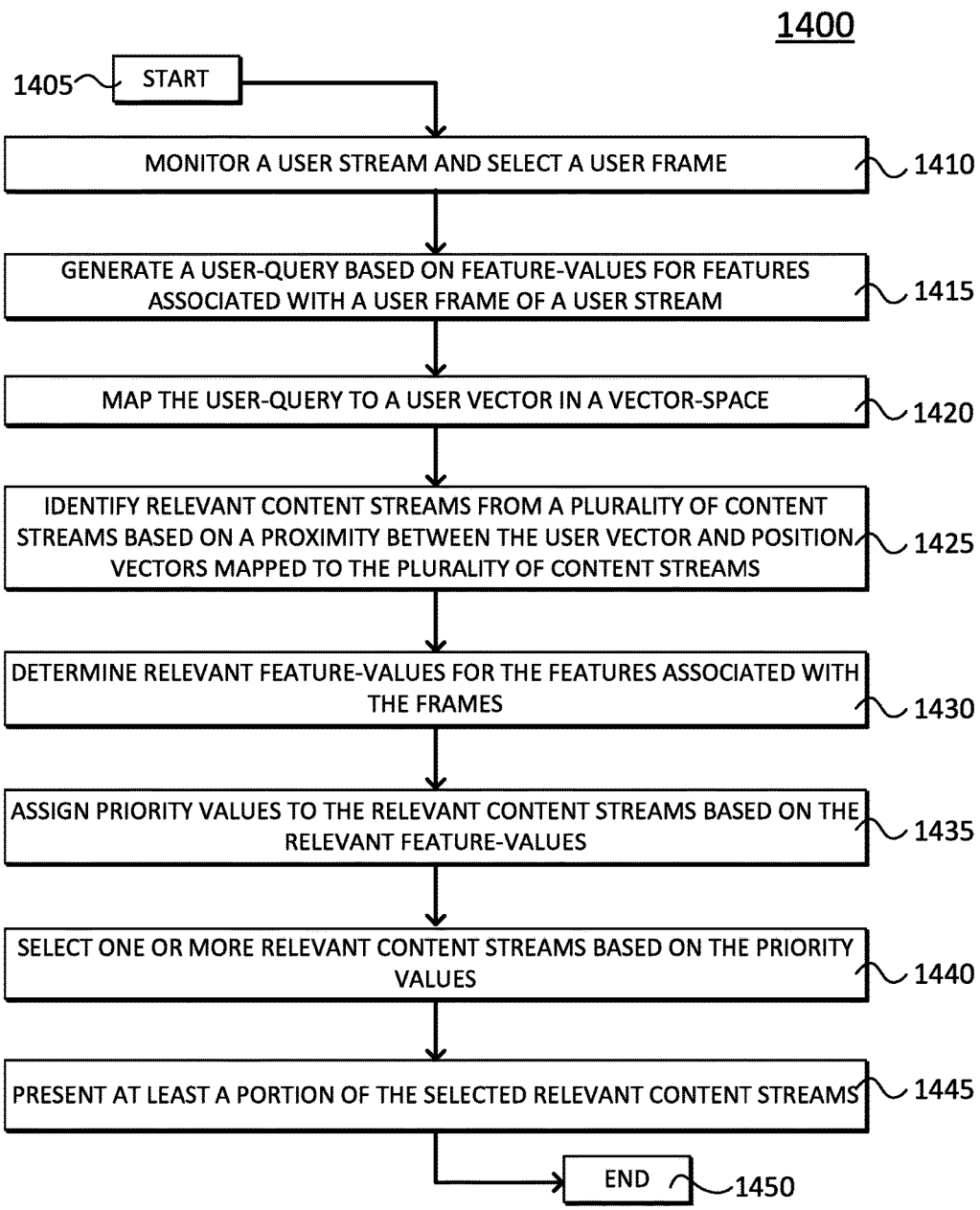
FIG. 14 illustrates an example simplified procedure for evaluating gameplay in a game environment.

FIG. 14 illustrates a simplified procedure 1400 for identifying relevant gameplay content for a game environment. As discussed below, procedure 1400 is described with respect to operations performed by a vector engine (e.g., vector engine 605 and/or vector engine 1005), however, it is appreciated such operations are not intended to be limited to the vector engine, and further such discussion is for purposes of illustration, not limitation.

Procedure 1400 begins at step 1405 and continues to step 1410 where, as discussed above, the vector engine monitors a user stream and selects a user frame. For example, in context of the game environment, a user may request/search for relevant gameplay content to assist the user through a gameplay transition. In such context, the vector engine monitors the user game play, selects a user frame from the user stream, and extracts feature-values for corresponding features to generate, in step 1415, a user query. The vector engine further maps the user query, in step 1420, to a user-vector in the vector-space, and identifies, in step 1425, relevant content streams based on proximity between vector positions mapped to the relevant content streams and the user-vector.

Next, in step 1430, the vector engine determines relevant feature-values for the features associated with the frames and, in step 1435, assigns priority values to the relevant content streams based on the relevant feature-values. For example, as mentioned above, the content streams may correspond to gameplay transitions in the game environment and the vector engine can determine gameplay transitions times for the content streams. In some embodiments, the vector engine compares the gameplay transition times to a threshold transition time to further filter/discard irrelevant content streams. While the transition times are one example of feature filtering/weighting, it is appreciated any number of features may be weighted or prioritized to identify relevant content streams for a given user query. In this sense, a character with specific attributes, a particular inventory of items, and/or other features may be more relevant to a specific user and may be accorded an appropriate weight/priority.

The vector engine further selects one or more relevant content streams, in step 1440, based on their respective priority values and, in step 1445, presents at least a portion (e.g., a thumbnail, etc.) of the selected relevant content streams to the user. The vector engine may provide any number of views to highlight the relevance for content streams (e.g., a list view, etc.) Procedure 1400 subsequently ends at step 1450, but may continue on to step 1410 where the vector engine monitors a user stream and selects a user frame.

It should be noted some steps within procedures 1300-1400 may be optional, and further the steps shown in FIGS. 13-14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1300 and 1400 are described separately, steps from each procedure may be incorporated into each other procedure, and the procedures are not meant to be mutually exclusive.

The techniques described herein, therefore, describe operations to create a framework in a vector-space and evaluate gameplay content in context of the vector-space. In particular, the techniques to evaluate the gameplay content include, for example, creating content streams from frames, determining user-locations in a game environment, identify content streams as relevant to a particular user, and the like. While there have been shown and described illustrative embodiments to evaluate gameplay content using the above-discussed vector-space using particular devices and/or modules (e.g., vector-engines), it is to be understood that various other adaptations and modifications may be made within the spirit and scope of the embodiments herein. For example, the embodiments have been shown and described herein with relation to certain systems, platforms, devices, and modules performing specific operations. However, the embodiments in their broader sense are not as limited, and may, in fact, such operations and similar functionality may be performed by any combination of the devices shown and described.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories such as disks, CDs, RAM, and EEPROM having program instructions executing on a computer, hardware, firmware, or a combination thereof.

Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code.

Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on.

Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures.

Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method of vector-based selection of content streams, the method comprising:
    storing information in memory regarding a vector-space that corresponds to a game environment, wherein a plurality of content streams available within the game environment is mapped to different position vectors within the vector-space;
    generating a user query based on feature-values for a set of features associated with a user frame of a user stream, that corresponds to current gameplay in the game environment;
    mapping the user query to a user vector in the vector-space corresponding to the game environment, wherein the mapped user vector represents each of the features of the user query as a different dimension in the vector-space;
    identifying distances between the mapped user vector and the position vectors mapped to the plurality of available content streams;
    selecting at least one of the available content streams based on a proximity between the mapped user vector and the position vector mapped to the selected content stream, the proximity indicated by the identified distances between the mapped user vector and the position vectors mapped to the plurality of available content streams; and
    presenting at least a portion of the selected content stream.

2. The method of claim 1, wherein the selected content stream comprise frames associated with the set of features, and further comprising:
    determining feature-values for the set of features associated with the frames; and
    assigning a priority value to the selected content stream based on the determined feature-values, wherein presenting at least the portion of the selected content stream is based on the assigned priority value.

3. The method of claim 2, wherein the set of features comprises one or more of a gameplay transition time, a gameplay status, a number of votes, a number of points, an inventory, a character selection, a health of a character, a sound, a color palette, a transition time, a level, a position, or a gameplay milestone.

4. The method of claim 1, wherein the plurality of content streams represents a gameplay transition in the game environment, and further comprising determining a gameplay transition time for each content stream of the plurality of content streams, wherein selecting the content stream is based on the gameplay transition time.

5. The method of claim 4, wherein the plurality of content streams are associated with the set of features, and further comprising determining the gameplay transition time for each content stream based on the feature-values for the features associated with the plurality of content streams.

6. The method of claim 1, wherein the plurality of content streams represent gameplay transitions in the game environment, and further comprising:
    determining gameplay transition times for the plurality of content streams; and
    comparing the gameplay transition times for the plurality of content streams to a threshold transition time, wherein the selected content stream is selected when the gameplay transition times satisfy the threshold transition time.

7. The method of claim 1, further comprising:
    monitoring the user stream; and selecting the user frame from a plurality of user frames that form the user stream.

8. The method of claim 1, wherein the plurality of content streams are associated with gameplay metrics that indicate popularity; and wherein selecting the content stream further comprises assigning a priority value to the selected content stream based on the gameplay metrics, wherein selecting the selected content stream is based on the assigned priority value.

9. The method of claim 1,
wherein the plurality of content streams comprise a first content stream that includes a first set of frames mapped to a first position vector and a second set of frames mapped to a second position vector,
wherein selecting the selected content stream further comprises selecting one of the first set of frames or the second set of frames based on a proximity between the user vector and the first position vector and a proximity between the user vector and the second position vector; and
wherein presenting at least the portion of the selected content stream further comprises presenting the one of the first set of frames or the second set of frames.

10. The method of claim 1, wherein the plurality of content streams are associated with the set of features, and further comprising:
determining feature-values for the set of features associated with the plurality of content streams; and
mapping the plurality of content streams to the position vectors in the vector-space based on the feature-values.

11. The method of claim 1, wherein presenting at least the portion of the selected content stream comprises presenting images that represent at least the portion of the selected content stream.

12. The method of claim 1, wherein generating the user query comprises extracting the feature-values for the set of features from the user frame.

13. The method of claim 12, further comprising monitoring the user stream for the set of features, wherein each of the feature-values is extracted from the user frame present within the monitored user stream.

14. A system for a vector-based selection of content streams, the system comprising:
memory that stores information regarding a vector-space that corresponds to a game environment, wherein a plurality of content streams available within the game environment is mapped to different position vectors within the vector-space;
a network interface that communicates over one or more communication networks; and
a processor coupled to the network interface and that executes instructions stored in memory, wherein execution of the instructions by the processor:
generates a user query based on feature-values for a set of features associated with a user frame of a user stream that corresponds to current gameplay in the game environment;
maps the user query to a user vector in the vector-space corresponding to the game environment, wherein the mapped user vector represents each of the features of the user query as a different dimension in the vector-space;
identifies distances between the mapped user vector and the position vectors mapped to the plurality of available content streams;
selects at least one of the available content streams based on a proximity between the mapped user vector and the position vector mapped to the selected content stream, the proximity indicated by the identified distances between the mapped vector and the position vectors mapped to the plurality of available content streams; and
presents at least a portion of the selected content stream.

15. The system of claim 14, wherein the processor executes further instructions to:
determine feature-values for the set of features associated with frames for the selected content stream; and
assign priority value to the selected content stream based on the feature-values, wherein at least the portion of the selected content stream is presented based on the assigned priority value.

16. The system of claim 15, wherein the set of features comprises one or more of a gameplay transition time, a gameplay status, a number of votes, a number of points, an inventory, a character selection, a health of a character, a sound, a color palette, a transition time, a level, a position, or a gameplay milestone.

17. The system of claim 14, wherein the plurality of content streams represent a gameplay transition in the game environment, wherein the processor executes further instructions to determine a gameplay transition time for each content stream of the plurality of content streams, wherein the selected content stream is selected based on the gameplay transition time for each content stream.

18. The system of claim 17, wherein the plurality of content streams are associated with the set of features, wherein the processor determines the gameplay transition time for each content stream based on feature-values for the set of features associated with the plurality of content streams.

19. The system of claim 14, wherein the plurality of content streams are associated with a gameplay metric that represents a popularity; and wherein the processor selects the selected content stream by assigning a priority value to the selected content stream based on the gameplay metric, wherein the selected content stream is selected based on the assigned priority value.

20. A tangible, non-transitory, computer-readable storage medium, having instructions encoded thereon, the instructions executable by a processor to perform a method of vector-based selection of content streams, the method comprising:
storing information in memory regarding a vector-space that corresponds to a game environment, wherein a plurality of content streams available within the game environment is mapped to different position vectors within the vector-space;
generating a user query based on feature-values for a set of features associated with a user frame of a user stream, that corresponds to current gameplay in the game environment;
mapping the user query to a user vector in the vector-space corresponding to the game environment, wherein the mapped user vector represents each of the features of the user query as a different dimension in the vector-space;
identifying distances between the mapped user vector and the position vectors mapped to the plurality of available content streams;
selecting at least one of the available content streams based on a proximity between the mapped user vector and the position vector mapped to the selected content stream, the proximity indicated by the identified distances between the mapped vector and the position vectors mapped to the plurality of available content streams; and presenting at least a portion of the selected content stream.

\* \* \* \* \*